(Model.)

D. W. SETTLE.
SINKER.

No. 484,254. Patented Oct. 11, 1892.

Witnesses:
Haskell Leighton
Jesse Gardner

Inventor:
David W. Settle

UNITED STATES PATENT OFFICE.

DAVID W. SETTLE, OF PADUCAH, KENTUCKY.

SINKER.

SPECIFICATION forming part of Letters Patent No. 484,254, dated October 11, 1892.

Application filed November 6, 1891. Serial No. 411,106. (Model.)

*To all whom it may concern:*

Be it known that I, DAVID W. SETTLE, of Paducah, in the county of McCracken and State of Kentucky, have invented certain new and useful Improvements in Sinkers for Fishing-Tackle, of which the following is a specification.

My invention relates to improvements in sinkers for fishing-tackle, in which the sinker can be shifted or moved to any part of the fishing-line at will without detaching the same from the line; and the objects of my invention are, first, to provide a means of releasing the hook when hung; second, to enable the placing another hook on the line without detaching or removing the sinker from the line. I attain these objects by the device illustrated in the accompanying drawings, in which—

Figure 1:
Figure 2:

Figure 1 is a full side view of the invention or sinker with the fishing-line extending through same and just as the sinker appears when placed on the line. Fig. 2 is an elongated section of the sinker with a view of the fishing-line passing through same.

The objects designed by this improvement are accomplished by piercing a hole $a$ in each end of the sinker at such an angle as to pass through each end of the same and out at the side of the sinker near each end and then perforating the sinker with two parallel holes $b$ near the middle, so that the fishing-line $c$ can be passed through the sinker from one end to the other by means of the holes made in the sinker, as fully shown in Fig. 2.

Whenever the hook is hung on a rock, limb, or other object, by sudden and repeated bobbing of the pole to which the line is attached or by sudden and repeated dipping or jerking of the line perpendicularly the sinker will be gradually shifted down the line to hook and will release it; or if the hook is broken or the line is broken between the sinker and the hook the sinker may then be removed higher on the line, so as to make room for a new hook, without the inconvenience of detaching or removing the sinker from the line.

Having thus described my invention, what I claim as new, and desire to secure by Letters Patent, is—

A sinker having openings therein transversely to its major axis and openings at the extremities thereof and merging into its surface, said openings being for the passage of the line and for sliding engagement therewith.

DAVID W. SETTLE.

Witnesses:
DANIEL B. SCHURER,
HORACE F. LYON.